(12) United States Patent
Kolehmainen et al.

(10) Patent No.: US 7,453,510 B2
(45) Date of Patent: Nov. 18, 2008

(54) IMAGING DEVICE

(75) Inventors: Timo Kolehmainen, Oulu (FI); Markku Rytivaara, Oulu (FI); Timo Tokkonen, Oulu (FI); Jakke Mäkelä, Turku (FI); Kai Ojala, Oulu (FI)

(73) Assignee: Nokia Corporation, Espoo (FI)

( * ) Notice: Subject to any disclaimer, the term of this patent is extended or adjusted under 35 U.S.C. 154(b) by 750 days.

(21) Appl. No.: 10/733,783

(22) Filed: Dec. 11, 2003

(65) Prior Publication Data

US 2005/0128335 A1 Jun. 16, 2005

(51) Int. Cl.
*H04N 5/225* (2006.01)
*H04N 9/09* (2006.01)
*H04N 9/097* (2006.01)
*G02B 27/10* (2006.01)

(52) U.S. Cl. .................. 348/340; 348/262; 348/267; 359/618

(58) Field of Classification Search .......... 348/340, 348/266, 265, 262, 218.1, 267, 274, 333.01, 348/220.1; 396/322, 333; 359/618
See application file for complete search history.

(56) References Cited

U.S. PATENT DOCUMENTS

| | | | | |
|---|---|---|---|---|
| 4,383,170 A | * | 5/1983 | Takagi et al. | 250/216 |
| 4,527,874 A | * | 7/1985 | Ohmura | 396/73 |
| 4,646,156 A | * | 2/1987 | Iizuka et al. | 348/368 |
| 5,051,830 A | * | 9/1991 | von Hoessle | 348/335 |
| 5,757,423 A | * | 5/1998 | Tanaka et al. | 348/218.1 |
| 5,926,218 A | * | 7/1999 | Smith | 348/207.99 |
| 6,101,334 A | * | 8/2000 | Fantone | 396/72 |
| 6,288,742 B1 | * | 9/2001 | Ansari et al. | 348/211.14 |
| 6,611,289 B1 | * | 8/2003 | Yu et al. | 348/265 |
| 6,643,457 B2 | * | 11/2003 | Chen | 396/74 |
| 6,765,617 B1 | * | 7/2004 | Tangen et al. | 348/340 |
| 6,980,248 B1 | * | 12/2005 | Suda | 348/335 |
| 2002/0020845 A1 | * | 2/2002 | Ogura et al. | 257/88 |
| 2002/0076218 A1 | | 6/2002 | Jones | |
| 2002/0089596 A1 | | 7/2002 | Suda | |
| 2002/0089698 A1 | * | 7/2002 | Inoue et al. | 358/302 |
| 2003/0020814 A1 | * | 1/2003 | Ono | 348/220.1 |
| 2003/0086013 A1 | * | 5/2003 | Aratani | 348/335 |
| 2003/0164895 A1 | | 9/2003 | Viinikanoja et al. | |
| 2004/0001145 A1 | | 1/2004 | Abbate | |

FOREIGN PATENT DOCUMENTS

| | | |
|---|---|---|
| EP | 1 067 802 A2 | 1/2001 |
| EP | 1 263 213 A1 | 12/2002 |
| JP | 2003110680 | 4/2003 |
| WO | WO 93/11631 * | 6/1993 |

* cited by examiner

*Primary Examiner*—David Ometz
*Assistant Examiner*—Wanda M Negron
(74) *Attorney, Agent, or Firm*—Hollingsworth & Funk, LLC

(57) ABSTRACT

An imaging device comprising at least one image capturing subsystem of a first type, comprising a lens arrangement, configured to produce images. The device further comprises at least one image capturing subsystem of a second type comprising a lens arrangement, having optical or light gathering properties different from the subsystem of first type, configured to produce an image, and a controller configured to select the subsystem with which an image is to be taken.

22 Claims, 4 Drawing Sheets

IMAGING DEVICE

FIELD

The invention relates to an imaging device. Especially the invention relates to digital imaging devices comprising more than one image capturing apparatus.

BACKGROUND

The popularity of photography is continuously increasing. This applies especially to digital photography as the supply of inexpensive digital cameras has improved. Also the integrated cameras in mobile phones have contributed to the increase in the popularity of photography.

For a large group of users, the size of a camera is an important criteria when selecting a camera. A small size camera is easier to carry than a large heavy camera. Also the quality of images is naturally important for every photographer. However, in traditional lens arrangements the physical size of the area (in digital cameras the sensor area) where the lenses produce the image determines the focal length and thus the height of the optics, assuming that the field of view is fixed. Thus, reducing height of the optics and the thickness of the camera also reduces the sensor area, and thus the image quality. One solution is to reduce the pixel size of the sensor area. Thus the resolution and quality is increased. Another solution to reduce the optics height is to divide the sensor area into subsensors which have lens arrangements of their own. For example, if the sensor area is divided into four subareas of equal size, then each subsensor size is reduced by two. Correspondingly, the focal length and thus the optical height are also reduced by two. One known solution is presented in U.S. 2002/0089596.

Users usually want versatile cameras with several different features. Including many features in small scale cameras has so far been difficult, if not impossible.

BRIEF DESCRIPTION OF INVENTION

An object of the invention is to provide an imaging device with versatile features.

According to an embodiment of the invention, there is provided an imaging device comprising at least one image capturing subsystem of a first type, comprising a lens arrangement and configured to produce images, at least one image capturing subsystem of a second type comprising a lens arrangement, having optical or light gathering properties different from the subsystem of first type, configured to produce an image, and a controller configured to select the subsystem with which an image is to be taken.

According to an embodiment of the invention, there is provided an imaging device comprising a lenslet array with four lenses, at least one sensor array, an image capturing subsystem of a first type comprising a lens arrangement, configured to produce images, the lens arrangement of the image capturing subsystem of a first type device comprising at least three lenses from the lenslet array, and a sensor array, an image capturing subsystem of a second type comprising a lens arrangement, having optical or light gathering properties different from the subsystem of first type, configured to produce an image, the lens arrangement of the image capturing subsystem of a second type device comprising at least one lens from the lenslet array, and a sensor array, and a controller configured to select the subsystem with which an image is to be taken.

The method and system of the invention provide several advantages. In general, the device comprises at least one image capturing subsystem of a second type having different light capturing or optical properties compared to subsystem of a first type. Thus the user of the device can easily take images of different properties without time consuming adjustments or without needing to change lens systems.

In an embodiment the imaging device of the invention thus comprises two image capturing subsystems having different types of optical or light gathering properties.

In an embodiment, where the invention is applied in a camera having a lenslet array of lenses, the additional features of the second type subsystem are available at a very low cost. For example, the imaging device may comprise a lenslet array with at least four lenses and a sensor array. The subsystem of the first type may comprise three lenses of the lenslet, each lens having a unique color filter from a group of RGB or CMY filters. Thus a color image can be produced with the three lenses. The fourth lens may be specially designed for different purposes.

In an embodiment of the invention, the subsystem of a second type has different optical properties. The subsystem may be, for example, a tele or a macro lens system. Thus the user may take different images of the same object very fast. This increases the usability of the camera. For example, in low-end cameras it has been necessary, so far, to design the lens arrangement for general use, as cost and size factors have limited the possibilities of several lenses. With the presented solution even low cost cameras may have sophisticated properties, such as lens arrangements suitable for macro or tele photography.

LIST OF DRAWINGS

In the following, the invention will be described in greater detail with reference to the preferred embodiments and the accompanying drawings, in which FIG. 1 illustrates an example of an imaging device of an embodiment;

DESCRIPTION OF EMBODIMENTS

Figure 1:
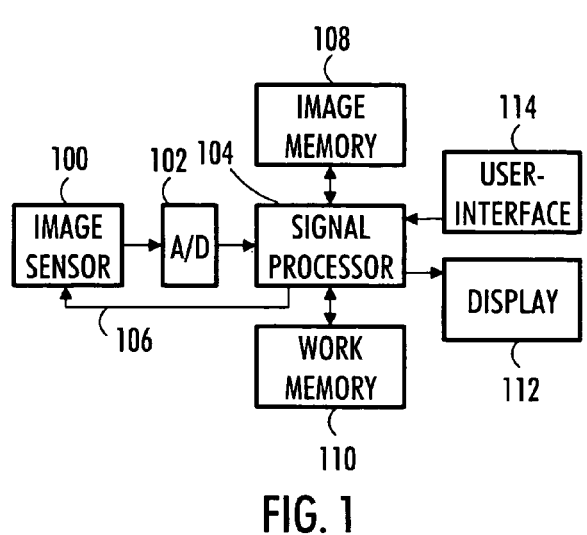

FIG. 1 illustrates a generalized digital image device which may be utilized in some embodiments of the invention. It should be noted that embodiments of the invention may also be utilized in other kinds of digital cameras than the apparatus of FIG. 1, which is just an example of a possible structure.

The apparatus of FIG. 1 comprises an image sensing arrangement 100. The image sensing arrangement comprises a lens assembly and an image sensor. The structure of the arrangement 100 will be discussed in more detail later. The image sensing arrangement captures an image and converts the captured image into an electrical form. The electric signal produced by the apparatus 100 is led to an A/D converter 102 which converts the analogue signal into a digital form. From the converter the digitized signal is taken to a signal processor 104. The image data is processed in the signal processor to create an image file. The output signal of the image sensing arrangement 100 contains raw image data which needs post processing, such as white balancing and color processing. The signal processor is also responsible for giving exposure control commands 106 to image sensing arrangement 100.

The apparatus may further comprise an image memory 108 where the signal processor may store finished images, a work memory 110 for data and program storage, a display 112 and a user interface 114, which typically comprises a keyboard or corresponding means for the user to give input to the apparatus.

Figure 2A:
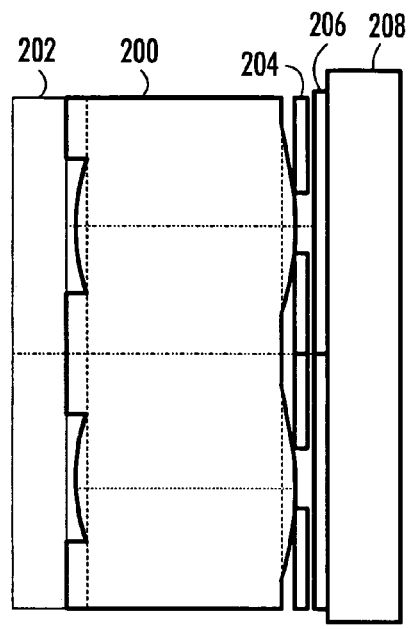
FIGS. 2A and 2B illustrate an example of an image sensing arrangement.

FIG. 2A illustrates an example of image sensing arrangement 100. The image sensing arrangement comprises in this example a lens assembly 200 which comprises a lenslet array with four lenses. The arrangement further comprises an image sensor 202, an aperture plate 204, a color filter arrangement 206 and an infra-red filter 208.

Figure 2B:
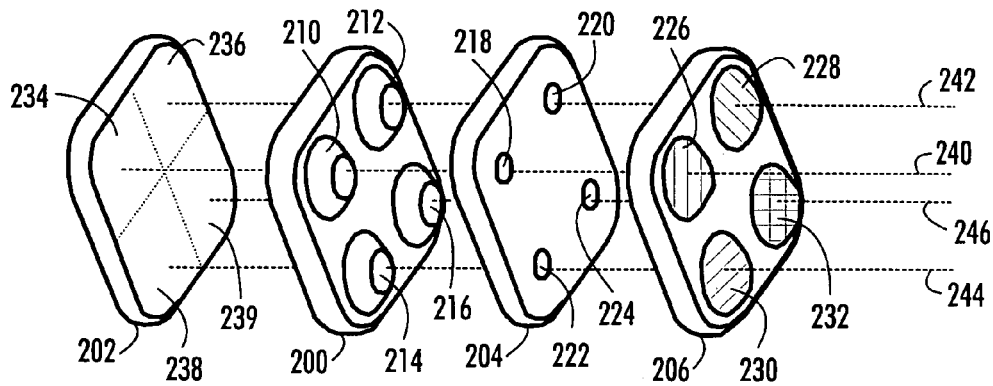

FIG. 2B illustrates the structure of the image sensing arrangement from another point of view. In this example the lens assembly 200 comprises four separate lenses 210-216 in a lenslet array. Correspondingly, the aperture plate 204 comprises a fixed aperture 218-224 for each lens. The aperture plate controls the amount of light that is passed to the lens. It should be noted that the structure of the aperture plate is not relevant to the embodiments, i.e. the aperture value of each lens needs not be the same. The number of lenses is not limited to four, either.

The color filter arrangement 206 of the image sensing arrangement comprises in this example three color filters, i.e. red 226, green 228 and blue 230 in front of lenses 210-214, respectively. The sensor array 202 is in this example divided into four sections 234 to 239. Thus, the image sensing arrangement comprises in this example four image capturing apparatus 240-246. Thus, the image capturing apparatus 240 comprises the color filter 226, the aperture 218, the lens 210 and the section 234 of the sensor array. Respectively, the image capturing apparatus 242 comprises the color filter 228, the aperture 220, the lens 212 and the section 236 of the sensor array and the image capturing apparatus 244 comprises the color filter 230, the aperture 222, the lens 214 and the section 238 of the sensor array. The fourth image capturing apparatus 246 comprises the aperture 224, the lens 216 and a section 239 of the sensor array. Thus, the fourth apparatus 246 does not in this example comprise a color filter.

The image sensing arrangement of FIGS. 2A and 2B is thus able to form four separate images on the image sensor 202. The image sensor 202 is typically, but not necessarily, a single solid-state sensor, such as a CCD (Charged Coupled Device) or CMOS (Complementary Metal-oxide Semiconductor) sensor known to one skilled in the art. In an embodiment, the image sensor 202 may be divided between lenses, as described above. The image sensor 202 may also comprise four different sensors, one for each lens. The image sensor 202 converts light into an electric current. This electric analogue signal is converted in the image capturing apparatus into a digital form by the A/D converter 102, as illustrated in FIG. 1. The sensor 202 comprises a given number of pixels. The number of pixels in the sensor determines the resolution of the sensor. Each pixel produces an electric signal in response to light. The number of pixels in the sensor of an imaging apparatus is a design parameter. Typically in low cost imaging apparatus the number of pixels may be 640×480 along the long and short sides of the sensor. A sensor of this resolution is often called a VGA sensor. In general, the higher the number of pixels in a sensor, the more detailed image can be produced by the sensor.

The image sensor 202 is thus sensitive to light and produces an electric signal when exposed to light. However, the sensor is not able to differentiate different colors from each other. Thus, the sensor as such produces only black and white images. A number of solutions are proposed to enable a digital imaging apparatus to produce color images. It is well known for one skilled in the art that a full color image can be produced using only three basic colors in the image capturing phase. One generally used combination of three suitable colors is red, green and blue RGB. Another widely used combination is cyan, magenta and yellow (CMY). Also other combinations are possible. Although all colors can be synthesized using three colors, also other solutions are available, such as RGBE, where emerald is used as the fourth color.

One solution used in single lens digital image capturing apparatus is to provide a color filter array in front of the image sensor, the filter consisting of a three-color pattern of RGB or CMY colors. Such a solution is often called a Bayer matrix. When using an RGB Bayer matrix filter, each pixel is typically covered by a filter of a single color in such a way that in horizontal direction every other pixel is covered with a green filter and every other pixel is covered by a red filter on every other line and by a blue filter on every other line. A single color filter passes through to the sensor pixel under the filter light which wavelength corresponds to the wavelength of the single color. The signal processor interpolates the image signal received from the sensor in such a way that all pixels receive a color value for all three colors. Thus a color image can be produced.

In the multiple lens embodiment of FIG. 2A a different approach is used in producing a color image. The image sensing arrangement comprises a color filter arrangement 206 in front of the lens assembly 200. In practice the filter arrangement may be located also in a different part of the arrangement, for example between the lenses and the sensor. In an embodiment the color filter arrangement 206 comprises three filters, one of each of the three RGB colors, each filter being in front of a lens. Alternatively also CMY colors or other color spaces may be used as well. In the example of FIG. 2B the lens 210 is associated with a red filter, the lens 212 with a green filter and the lens 214 with a blue filter. Thus one lens 216 has no color filter. As illustrated in FIG. 2A, the lens assembly may in an embodiment comprise an infra-red filter 208 associated with the lenses. The infra-red filter does not necessarily cover all lenses at it may also be situated elsewhere, for example between the lenses and the sensor.

Each lens of the lens assembly 200 thus produces a separate image to the sensor 202. The sensor is divided between the lenses in such a way that the images produced by the lenses do not overlap. The area of the sensor divided to the lenses may be equal, or the areas may be of different sizes, depending on the embodiment. Let in this example assume that the sensor 202 is a VGA imaging sensor and that the sections 234-239 allocated for each lens are of Quarter VGA (QVGA) resolution (320×240).

Figure 2C:
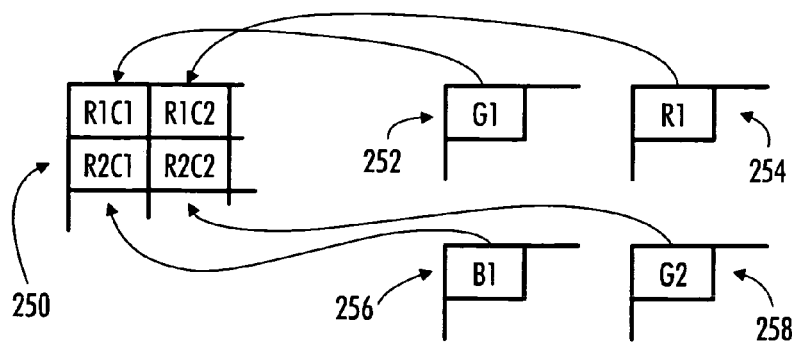
FIG. 2C illustrates an example of color image combining.

As described above, the electric signal produced by the sensor 202 is digitized and taken to the signal processor 104. The signal processor processes the signals from the sensor in such a way that three separate subimages from the signals of lenses 210-214 are produced, one filtered with a single color. The signal processor further processes the subimages and combines a VGA resolution image from the subimages. FIG. 2C illustrates one possible embodiment to combine the final image from the subimages. This example assumes that each lens of the lenslet comprises a color filter, in such a way that there are two green filters, one blue and one red. FIG. 2C shows the top left corner of the combined image 250, and four subimages, a green one 252, a red one 254, a blue one 256 and a green one 258. Each of the subimages thus comprises a 320×240 pixel array. The top left pixels of the subimages correspond to each other and differ only in that the color filter used in producing the pixel information is different. The subimages are first registered. Registering means that any two image points are identified as corresponding to the same physical point. The top left pixel R1C1 of the combined image is taken from the green1 image 252, The pixel R1C2 is taken from the red image 254, the pixel R2C1 is taken from the blue image 256 and the pixel R2C2 is taken from the green2 image 258. This process is repeated for all pixels in the combined image 250. After this the combined image pixels are fused together so that each pixel has all three RGB colors. The final image corresponds in total resolution with the image produced with a single lens system with a VGA sensor array and a corresponding Bayer color matrix.

In an embodiment, when composing the final image, the signal processor 104 may take into account the parallax error arising from the distances of the lenses 210-214 from each other.

The electric signal produced by the sensor 202 is digitized and taken to the signal processor 104. The signal processor processes the signals from the sensor in such a way that three separate subimages from the signals of lenses 210-214 are produced, one being filtered with a single color. The signal processor further processes the subimages and combines a VGA resolution image from the subimages. Each of the subimages thus comprise a 320×240 pixel array. The top left pixels of the subimages correspond to each other and differ only in that the color filter used in producing the pixel information is different. Due to the parallax error the same pixels of the subimages do not necessarily correspond to each other. The parallax error is compensated by an algorithm. The final image formation may be described as comprising many steps: first the three subimages are registered (also called matching). Registering means that any two image points are identified as corresponding to the same physical point). Then, the subimages are interpolated and the interpolated subimages are fused to an RGB-color image. Interpolation and fusion may also be in another order. The final image corresponds in total resolution with the image produced with a single lens system with a VGA sensor array and a corresponding Bayer color matrix.

Figure 3:
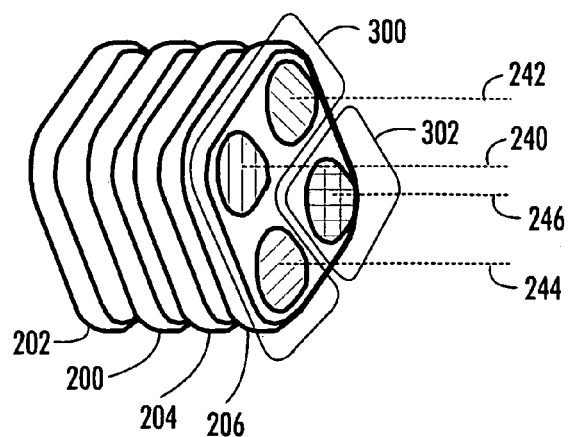
FIG. 3 illustrates an embodiment of the invention.

FIG. 3 illustrates an embodiment of the invention. FIG. 3 shows the lens assembly 200, the image sensor 202, the aperture plate 204, the color filter arrangement 206 and four image capturing apparatus 240-246 in a more compact form. In this embodiment the image capturing subsystem 300 of a first type comprises a lens arrangement consisting of the three image capturing apparatus 240-244. The image capturing subsystem 302 of a second type comprises a lens arrangement consisting of the fourth image capturing apparatus 246.

In an embodiment, the image capturing subsystem 300 produces a color image with the three image capturing apparatus 240-244. The image capturing subsystem 302 comprising the fourth image capturing apparatus 246 may have different light gathering or optical properties compared with the other subsystem. The fourth image capturing apparatus 246 may be equipped with a Bayer matrix color filter, in which case it is able to produce color images. Otherwise it may produce black and white (B/W) or grayscale images.

In an embodiment, the image capturing subsystem 302 of a second type comprises a macro lens arrangement. Macro arrangement means that a lens is focused or designed to produce a sharp image from objects near the lens. Focusing is usually done by moving the whole lens and/or the image sensor to a distance from each other along the optical axis. In a lenslet system the fourth lens can be a macro lens and still moulded into the same plastic lens block as the other three lenses. For example, if the image capturing subsystem 300 of a first type has a focus range from 30 cm to infinity, the image capturing subsystem 302 of a second type with a macro lens arrangement could have a focus range from 10 cm to 30 cm. Thus the total focus range and the usage scope of the device are large.

Figure 4:
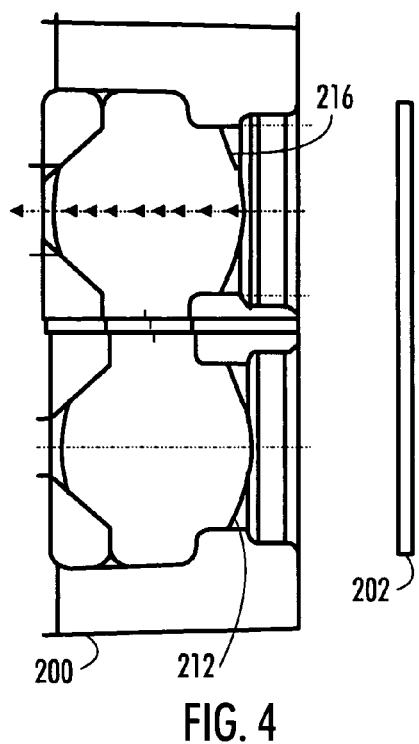
FIG. 4 illustrates an embodiment with a macro lens.

In an embodiment, a macro lens is designed to focus near and optionally to have field of view different from the other lenses. Thus the optical properties of the macro lens are different compared to the other lenses. In an embodiment a macro lens uses the same surface form but the lens distance from the sensor is longer than in other lenses. FIG. 4 illustrates this embodiment. FIG. 4 shows two lenses of the lens arrangement 200, a normal lens 212 used in the subsystem 300 of a first type and lens 216 used as a macro lens in the subsystem 302 of a second type. In addition, the image sensor 202 is shown. In this embodiment the macro lens 212 is shifted in relation to the image sensor. For example, assume that the lens 216 has a fixed focus to 500 mm. A focus change from 500 mm to 50 mm for the macro lens requires that the lens 216 be shifted 0.76 mm from the image sensor 202, assuming that the focal length of the lens is 2 mm.

In an embodiment, the image capturing subsystem 302 of a second type comprises a high magnification lens arrangement. Thus, the device can be used as an electrical magnifier. This can be achieved utilising the macro lens arrangement described above in addition to a different lens design. In an embodiment the lens is a tele lens, which has macro properties. This has the advantage of being able to focus on objects near the lens and to obtain a high magnification. For a tele lens the focal length is longer and the field of view narrower than in other lenslet camera lenses.

Figure 5:
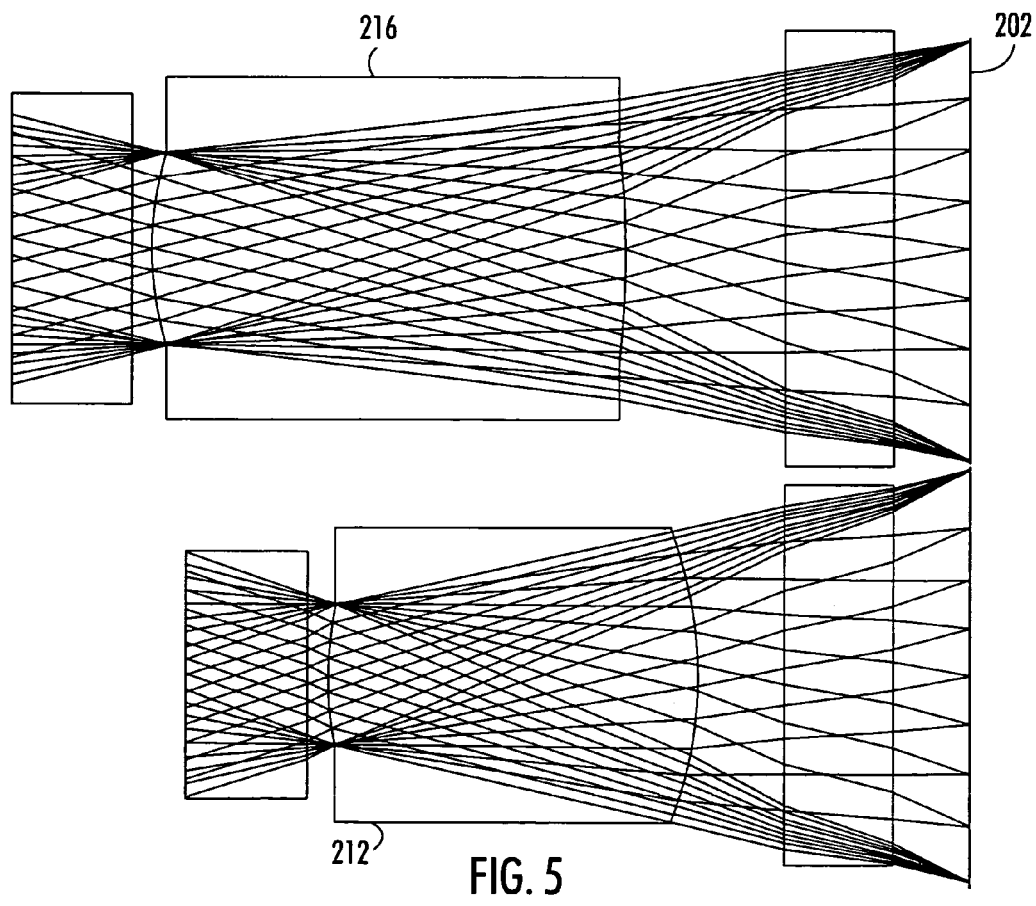
FIG. 5 illustrates an embodiment with a high magnification lens.

FIG. 5 illustrates this embodiment. FIG. 5 shows two lenses of the lens arrangement 200, the normal lens 212 used in the subsystem 300 of a first type and the lens 216 used as a magnifying lens in the subsystem 302 of a second type. In addition, the image sensor 202 is shown. The pixel size and resolution are equal in both subsystems. FIG. 5 illustrates an example where the lens 212 has a focal length of 2 mm and is focused to 500 mm. The magnifying lens 216 has a focal length of 2.7 mm and is focused to 50 mm.

In an embodiment, the image capturing subsystem 302 of a second type comprises a tele lens arrangement. The field of view is smaller for a tele lens compared to other lenses. The dimensions of a tele lens are different compared to other lenses. The focal length and the total length of a tele lens are bigger. The bigger size can be compensated by designing a smaller image sensor area with smaller pixel size for the tele subsystem. When the physical dimensions of the image sensor are smaller, also the lens associated with the sensor may be smaller. By reducing the pixel size in relation to the smaller dimensions the resolution of the tele subsystem remains unchanged.

Figure 6:
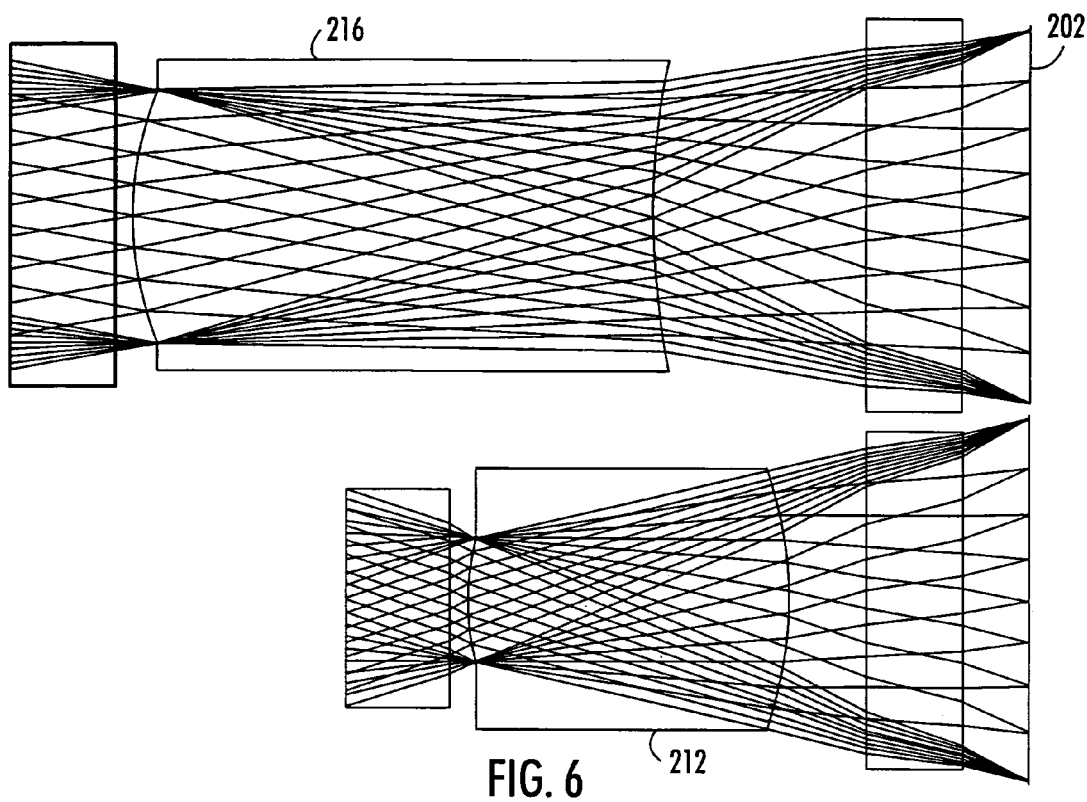
FIG. 6 illustrates an embodiment with a tele lens.

FIG. 6 illustrates this embodiment. FIG. 6 shows two lenses of the lens arrangement 200, the normal lens 212 used in the subsystem 300 of a first type and the lens 216 used as a tele lens in the subsystem 302 of a second type. In addition, the image sensor 202 is shown. The pixel size and resolution are equal in both subsystems. FIG. 6 illustrates an example where the lens 212 has a focal length of 2 mm and is focused to 1000 mm. The tele lens 216 has a focal length of 4.0 mm and it is also focused to 1000 mm. In the illustrated example the tele lens 216 has a double magnification compared to other lenses.

In an embodiment, the image capturing subsystem 302 of a second type comprises a wide-angle lens arrangement. The field of view is larger for a tele lens compared to other lenses. The dimensions of a wide-angle lens are different compared to other lenses. In a wide-angle lens the focal length is smaller than in normal lenses.

Figure 7:
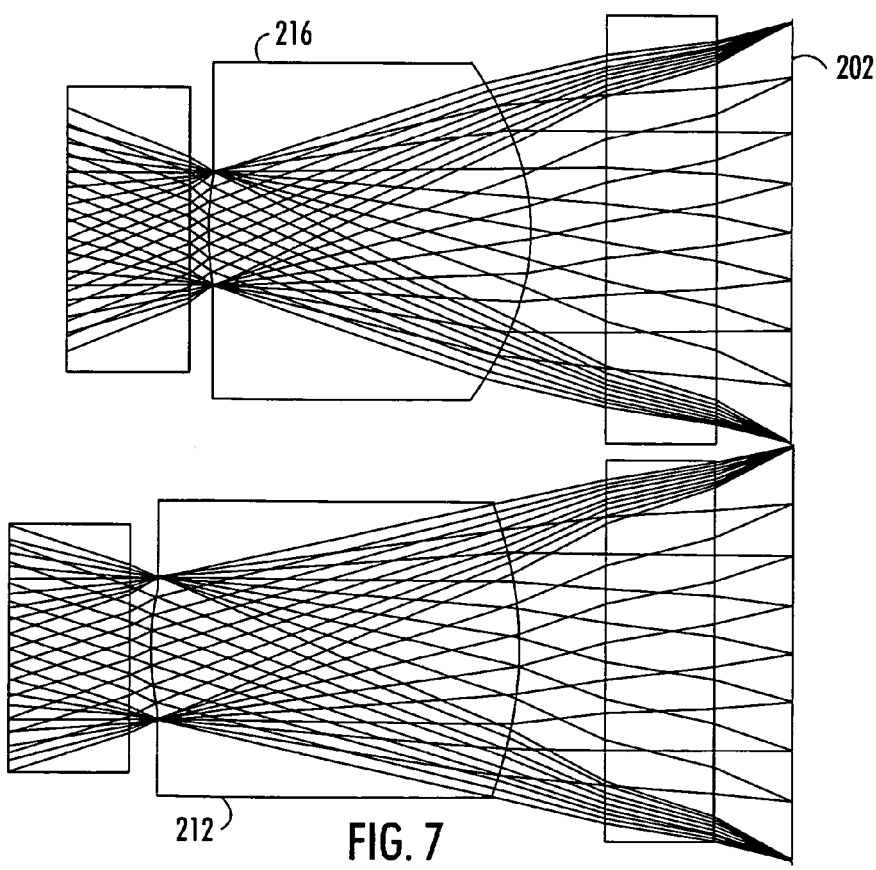
FIG. 7 illustrates an embodiment with a wide-angle lens.

FIG. 7 illustrates this embodiment. FIG. 7 shows two lenses of the lens arrangement 200, the normal lens 212 used in the subsystem 300 of a first type and the lens 216 used as a wide-angle lens in the subsystem 302 of a second type. In addition, the image sensor 202 is shown. The pixel size and resolution are equal in both subsystems. FIG. 7 illustrates an example where the lens 212 has a focal length of 2 mm and is focused to 500 mm. The wide-angle lens 216 has a focal length of 1.5 mm and it is focused to 500 mm.

In an embodiment, the image capturing subsystem 302 of a second type comprises an anamorphically cylindrical lens. An anamorphic lens is designed for a different field of view in vertical and horizontal directions. With such a lens it is possible to take very wide-angle images, for example panorama images. In an embodiment the image capturing subsystem 302 comprises a lens that has a wide horizontal view. The lens of the subsystem produces on the image sensor an image, which is compressed in horizontal direction. The processor producing the final image corrects distortions arising from the anamorphic lens in a manner known for one skilled in the art.

Figure 8:
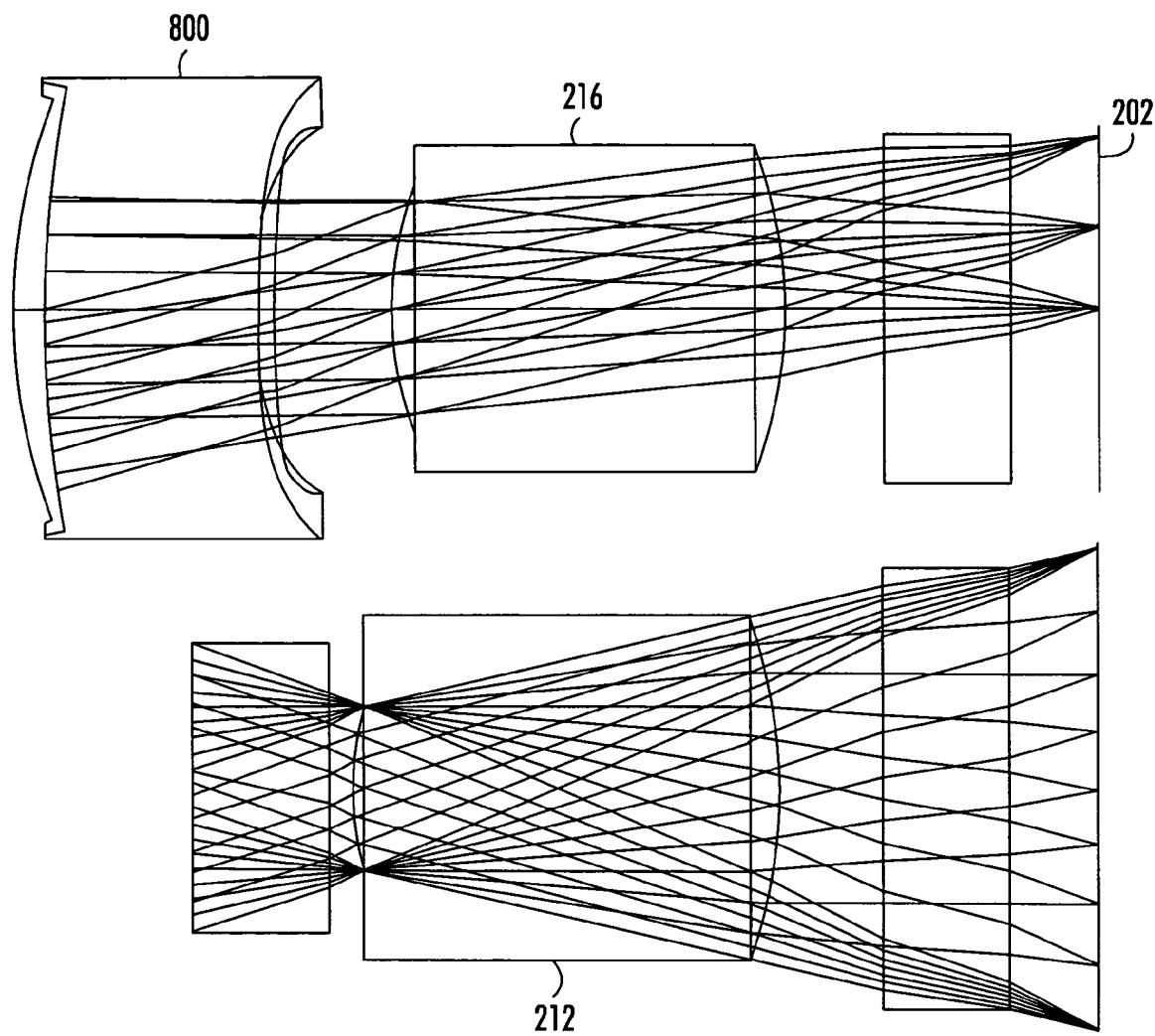
FIG. 8 illustrates an embodiment with an anamorphic lens.

FIG. 8 illustrates this embodiment. FIG. 8 shows two lenses of the lens arrangement 200, a normal lens 212 used in the subsystem 300 of a first type and in the subsystem 302 of a second type an anamorphic lens 800 in front of a lens 216 of a normal design. The anamorphic lens modifies the image in the above described manner so that panorama images, for example, can be taken. In addition, the image sensor 202 is shown. In the embodiment of FIG. 8, the lens 800 has a horizontal field of view of 48° and a vertical field of view of 40°. The pixel size and resolution are equal in both subsystems. In an embodiment the lens 216 itself is designed to be anamorphic, in which case there is no need for lens 800.

Referring to FIGS. 1 and 2B, in an embodiment the image capturing subsystem 302 of a second type comprises a Bayer matrix color filter 232 or a corresponding color matrix filter and thus it is able to produce color images. The processor 104 is configured to take images with the subsystems 300 and 302 in sequence with small intervals so that fast motion objects can be captured on images. The exposure times of the subsystem may be synchronized such that the image taken by the subsystem 302 is captured with a programmable delay from the subsystem 300. The delay can be very short, as electronic shutters are used.

In an embodiment, the second subsystem is arranged to take images in the same color space as the first subsystem. In this embodiment both subsystems may produce grayscale images, for example.

In an embodiment, the resolution of the image produced by the image capturing subsystem of a second type is some resolution commonly used in applications such as videoconferencing, where the required resolution can be much smaller than in still imaging. Examples of such formats are CIF (Common Intermediate Format) and QCIF (Quarter CIF). CIF comprises 288 lines and 352 pixels per line. QCIF comprises one fourth of the size of CIF, that is 144 lines and 176 pixels per line. This may be achieved, for example, by selecting the number of pixels in the image sensor of the subsystem 302 accordingly. Thus, the image taken by the subsystem 302 may be directly used in videoconferencing applications without any conversions that may be needed to change the image into the required format. This reduces delay and the current consumption in a portable device.

Even though the invention is described above with reference to an example according to the accompanying drawings, it is clear that the invention is not restricted thereto but it can be modified in several ways within the scope of the appended claims.

The invention claimed is:

1. An imaging device comprising
an image memory for storing images,
a lenslet array with at least four lenses,
at least one image capturing subsystem of a first type, comprising a lens arrangement including three lenses from the lenslet array and a portion of a sensor array, configured to produce images,
at least one image capturing subsystem of a second type comprising a lens arrangement including the fourth lens from the lenslet array and a portion of the sensor array, having optical or light gathering properties different from the subsystem of first type, configured to produce an image, and
a controller configured to select the subsystem with which an image is to be taken wherein an image is captured and stored only with the selected subsystem.

2. The device of claim 1, wherein the image capturing subsystem of the second type comprises a macro lens arrangement.

3. The device of claim 1, wherein the image capturing subsystem of the second type comprises a high magnification lens arrangement.

4. The device of claim 1, wherein the image capturing subsystem of the second type comprises a tele lens arrangement.

5. The device of claim 1, wherein the image capturing subsystem of the second type comprises a wide-angle lens arrangement.

6. The device of claim 1, wherein the image capturing subsystem of the second type comprises an anamorphically cylindrical lens.

7. The device of claim 1, wherein the image capturing subsystem of the second type comprises a color matrix filter, and the controller is configured to take images with the subsystems in sequence to capture fast motion objects.

8. The device of claim 1, wherein the image capturing subsystems of the first and the second type are configured to produce images in the same color space.

9. The device of claim 1, wherein the resolution of the image produced by the image capturing subsystem of the second type is a resolution used in videoconferencing applications.

10. The device of claim 9, wherein the resolution of the image produced by the image capturing subsystem of the second type is CIF or QCIF.

11. The device of claim 1, wherein the image capturing subsystems comprise a lens system and a sensor array configured to produce an electric signal and the device comprises a processor operationally connected to the sensor arrays and configured to produce an image proportional to the electrical signal received from the sensor arrays.

12. The device of claim 11, wherein the device comprises a sensor array divided between image capturing subsystem types.

13. The device of claim 1 wherein image capturing subsystem of a first type is configured to produce a color image and the image capturing subsystem of the second type is configured to produce an image.

14. The device of claim 13, wherein the lens arrangement of the image capturing subsystem of the first type comprises a red, green and blue color filter, each associated with a lens.

15. The device of claim 13, wherein the lens arrangement of the image capturing subsystem of the first type comprises a cyan, magenta and yellow color filter, each associated with a lens.

16. The device of claim 13, wherein the lens arrangement of the subsystem of the second type comprises a Bayer matrix.

17. An imaging device comprising
an image memory for storing images,
a lenslet array with four lenses,
at least one sensor array,
an image capturing subsystem of a first type comprising a lens arrangement, configured to produce images, the lens arrangement of the image capturing subsystem of a first type device comprising three lenses from the lenslet array, and a sensor array,
an image capturing subsystem of a second type comprising a lens arrangement, having optical or light gathering properties different from the subsystem of first type, configured to produce an image, the lens arrangement of the image capturing subsystem of a second type device comprising at least one lens from the lenslet array, and a sensor array, and
a controller configured to select the subsystem with which an image is to be taken and to capture and store an image only with the selected subsystem.

18. The device of claim 17, wherein the device comprises a sensor array divided between image capturing subsystem types.

19. The device of claim 17, wherein the image capturing subsystem of the first type is configured to produce a color image.

20. A method comprising:
collecting first image data via an image capturing subsystem of a first type comprised of three lenses from a lenslet array and a portion of a sensor array;
collecting second image data via an image capturing subsystem of a second type comprised of a fourth lens from the lenslet array and a portion of the sensor array having optical or light gathering properties different from the subsystem of the first type, wherein the first and second image data correspond to the same image;
selecting the subsystem with which to capture the image;
capturing the image with only one subsystem; and
storing the captured image in an image memory.

21. The method of claim 20, further comprising capturing the image in color via the image capturing subsystem of the first type.

22. The method of claim 20, further comprising capturing the image in color via the image capturing subsystem of the second type.

* * * * *